United States Patent [19]

Britzke et al.

[11] 4,282,686

[45] Aug. 11, 1981

[54] SWINGING DOOR FOR VEHICLES

[75] Inventors: Ingo Britzke, Kassel; Manfred Horn, Kaufungen, both of Fed. Rep. of Germany

[73] Assignee: Gebr. Bode & Co., Kassel, Fed. Rep. of Germany

[21] Appl. No.: 70,156

[22] Filed: Aug. 27, 1979

[30] Foreign Application Priority Data

Sep. 4, 1978 [DE] Fed. Rep. of Germany ....... 2838486

[51] Int. Cl.³ ...................... E05D 15/28; E05F 15/04
[52] U.S. Cl. ......................................... 49/253; 49/334
[58] Field of Search ................. 49/334, 335, 336, 337, 49/333, 324, 340, 338, 253

[56] References Cited

U.S. PATENT DOCUMENTS

| 636,555 | 11/1899 | Probst | 49/335 |
| 965,009 | 7/1910 | Philbrick | 49/334 X |
| 3,675,370 | 7/1972 | Catlett | 49/253 |

FOREIGN PATENT DOCUMENTS 2320570  11/1974  Fed. Rep. of Germany ............ 49/334

Primary Examiner—Philip C. Kannan
Attorney, Agent, or Firm—Hane, Roberts, Spiecens & Cohen

[57] ABSTRACT

A swinging door construction for a vehicle comprising a door panel having upper and lower swing arms coupled thereto and connected to a rotatable swing column. A drive mechanism is secured to the body of the vehicle and operatively engages the swing column to rotate the same and effect swinging of the door. The lower swing arm is connected to the swing column by a connecting member which extends upwardly above the drive mechanism and is secured to the swing column.

9 Claims, 5 Drawing Figures

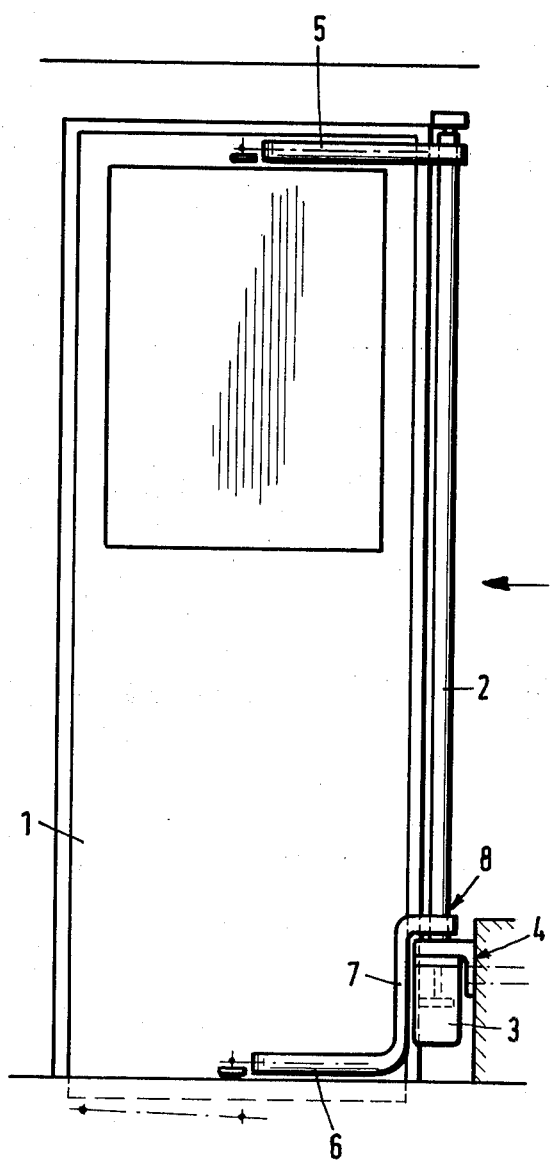

SWINGING DOOR FOR VEHICLES

FIELD OF THE INVENTION

The invention relates to a swinging door for vehicles, particularly automotive vehicles, which is swingable by means of swing arms fastened to a swing column and a thrust-piston drive for turning the swing column is arranged by means of a worm mechanism at the lower end thereof in its longitudinal direction.

PRIOR ART

In one known swing door of this construction, the upper and lower swing arms are, in each case, located above the thrust-piston drive. The lower swing arm lies in a region which interferes with entry into the vehicle which is not desirable.

There is also known a swing door whose swing column is driven by means of a pneumatic rotary cylinder drive which lies in the longitudinal direction of the swing column and the stub shafts of which are connected at the upper end to the swing column and at the lower end to the lower swing arm.

In this construction, the pneumatic rotary cylinder drive is an integral part of the swing column, which has the disadvantage that replacement of the pneumatic rotary cylinder drive or of parts thereof can be effected only with great difficulties.

SUMMARY OF THE INVENTION

An object of the present invention is to provide a swing door whose swing column is turnable by means of a thrust-piston drive and an interposed worm mechanism such that the lower swing arm can be arranged as far at the bottom as possible, while easy accessibility to the thrust-piston drive is nevertheless retained.

In accordance with the invention, this object is achieved in the manner that the lower swing arm is held by a connecting means to the swing column, said connecting means extending above the thrust-piston drive and being fastened to the swing column above the thrust-piston drive.

The connecting means can be constructed as a yoke which, in accordance with one embodiment of the invention, is bent at its end so that the thrust-piston drive is surrounded by the yoke.

In another embodiment, the yoke is bent in a Z shape at its end so that the swing arm can be arranged at the lower end of the yoke or form a unit with the yoke.

This latter construction of the swing arm has the advantage that, on the one hand, the lower swing arm can be arranged below the thrust-piston drive while, on the other hand, due to the suspended arrangement of the thrust-piston drive on the swing column, its simple replacement is assured at any time.

BRIEF DESCRIPTION OF THE DRAWING

Several illustrative embodiments of the invention are shown in the drawing in which:

FIG. 1 is a front, elevational view of one embodiment of the invention;

FIG. 2 is a side view of the embodiment in FIG. 1;

DETAILED DESCRIPTION

Figure 3:
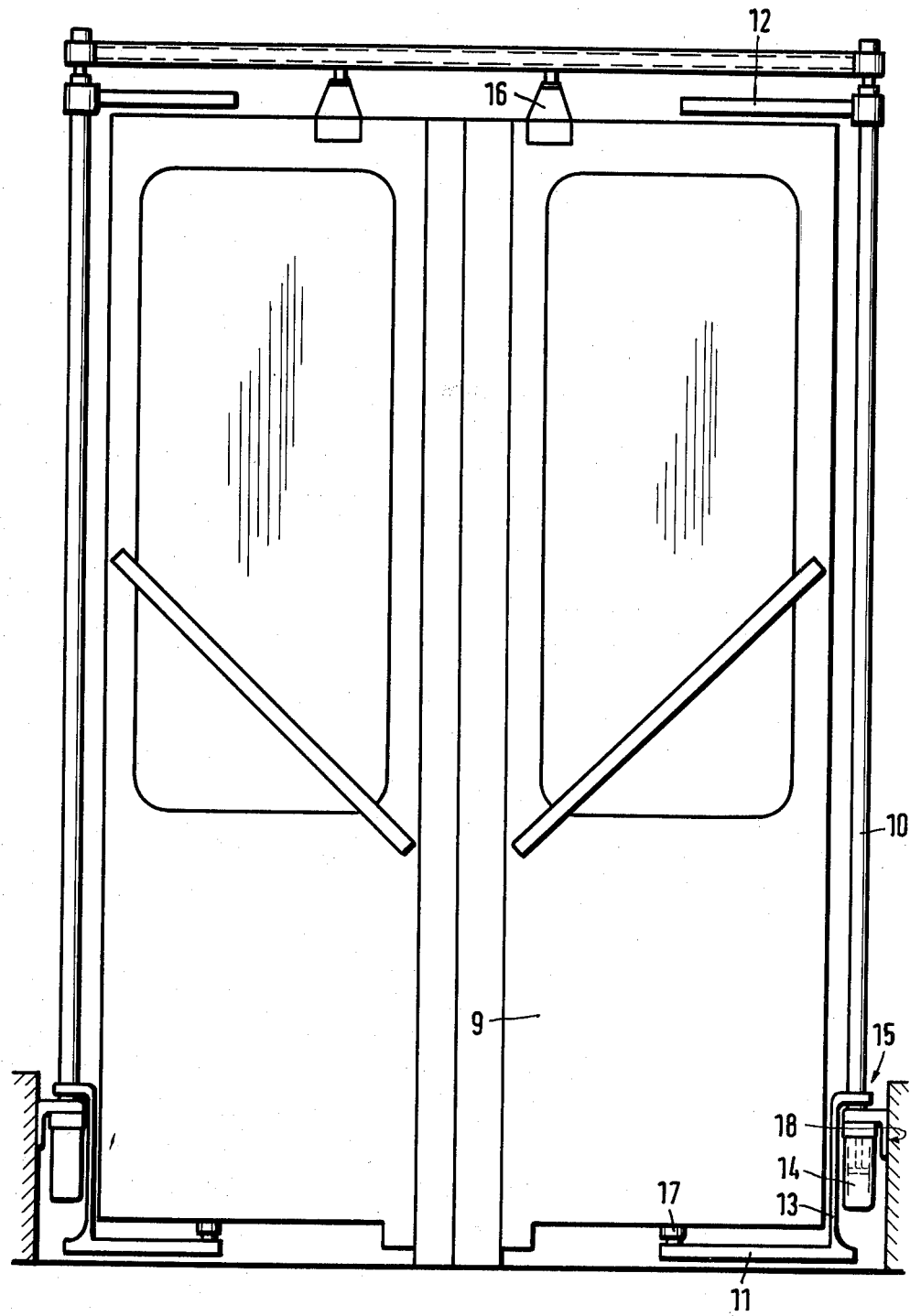
FIG. 3 is a front elevational view of another embodiment.

In the embodiment shown in FIGS. 1 and 2, the door panel is designated 1, and the door panel is swingable by means of a swing column 2 extending substantially parallel to the outer wall of the support body, e.g. a vehicle body. The drive of the swing column 2 is effected by means of a thrust-piston drive 3 which is arranged at the lower end of the swing column 2 and is fastened to the body at 4. The turning of the swing column takes place in known manner by means of a worm mechanism (not shown) arranged in the swing column.

An upper swing arm 5 is arranged on the swing column. A lower swing arm 6 is connected by a connecting means 7, which extends above the thrust piston drive 3, to the swing column at 8.

The connecting means 7 in this embodiment is constructed as a yoke which is bent at its upper end and which is continued by the swing arm 6 at its lower end. The swing arm 6 together with the connecting means 7 is of Z shape in this embodiment and is formed as a single unit.

In FIG. 3 there is shown an embodiment in which the swinging of door panel 9 takes place in similar manner by means of swing column 10. The construction further comprises lower swing arm 11 and upper swing arm 12. The lower swing arm 11 is fastened to a connecting means 13 which extends in the longitudinal direction of the swing column above the thrust-piston drive 14 which is fastened at 18 to the body.

In this embodiment, the connecting means 13 is also fastened to the swing column 10 above the thrust-piston drive 14 at 15.

In this embodiment of the swinging door, the door panel 9 upon its swinging movement also carries out a turning movement around pivot pin 17 as a result of a guide 16, so that, when open, the plane of the door panel is perpendicular to the body of the vehicle.

Figure 5:
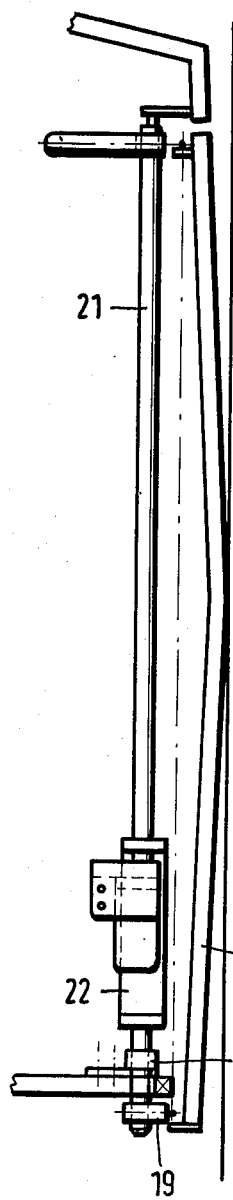
FIG. 5 is a side view of the embodiment in FIG. 4.
Figure 4:
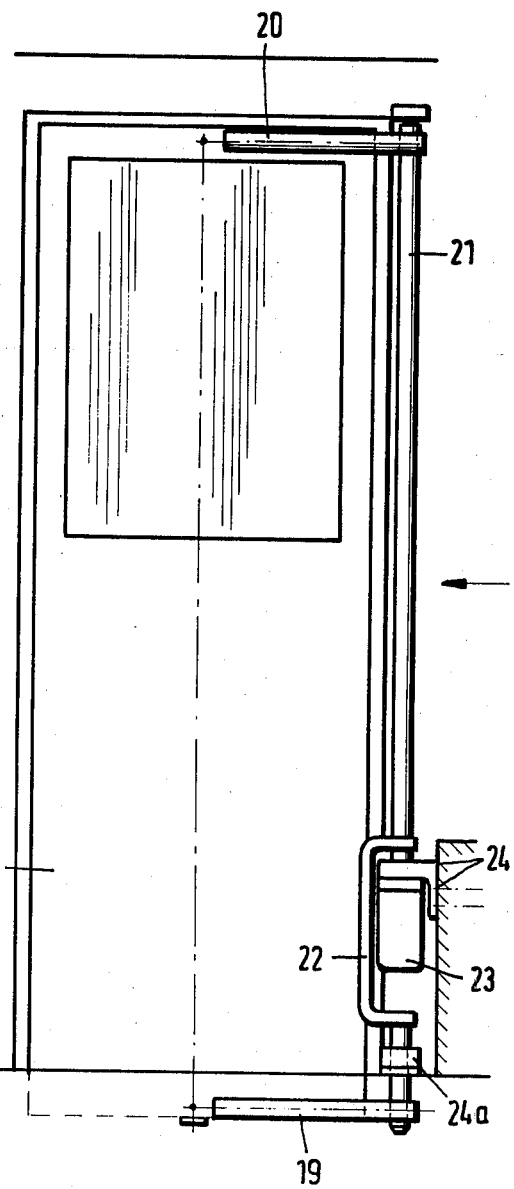
FIG. 4 is a front, elevational view of another embodiment.

In FIGS. 4 and 5 a somewhat different embodiment is shown. In this embodiment, the swinging of the door panel 18 also takes place by means of swing arms 19 and 20 which are coupled to the swing column 21. The lower swing arm 19 is, in this case, attached to the swing column 21 by a connecting means having the shape of a bent yoke 22. The yoke 22 extends above the thrust-piston drive 23 which is fastened at 24 to the body. The yoke 22 is supported on the body by means of a step bearing 24a.

In this embodiment, the lower swing arm 19 can be arranged below the sill.

The thrust-piston drive may be a pneumatic thrust piston drive.

What is claimed is:

1. A swinging door construction for a vehicle comprising a turnable door panel, upper and lower swing arms connected to said door panel, a rotatable swing column having upper and lower ends, means connecting said swing arms to said swing column such that rotation of said swing column produces turning of said door panel, drive means supported at the lower end of said swing column for rotating said swing column, said lower swing arm being at a level below said drive means, said means which connects the lower swing arm to the swing column comprising a connecting means extending alongside and above said drive means to overlap said drive means and being secured to the swing column at a level above said drive means.

2. A swinging door construction according to claim 1, wherein said connecting means comprises a yoke having a bent end to which the swing arms is fastened.

3. A swinging door construction according to claim 2, wherein said bent end is integral with said swing arm and forms a single unit therewith.

4. A swinging door construction according to claim 3 wherein said single unit is of Z-shape.

5. A swinging door construction according to claim 1 wherein said swing arms are pivotably connected to said door panel.

6. A swinging door construction according to claim 1 wherein said vehicle includes a body and said construction further comprises means supporting said drive means from said body.

7. A swinging door construction according to claim 1 wherein said drive means comprises a thrust-piston drive.

8. A swinging door construction according to claim 1 comprising means for turning said door panel as it swings.

9. A swinging door construction according to claim 8 wherein said door panel turns about an axis spaced from said swing column.

* * * * *